United States Patent [19]

Okuno et al.

[11] Patent Number: 5,281,633
[45] Date of Patent: Jan. 25, 1994

[54] UNSATURATED POLYESTER MOLDING COMPOUNDS AND THE ARTICLES THEREOF

[75] Inventors: Toshifumi Okuno, Ibaraki; Nobuyuki Nakagawa, Toyono, both of Japan

[73] Assignee: Takeda Chemical Industries, Ltd., Osaka, Japan

[21] Appl. No.: 797,150

[22] Filed: Nov. 26, 1991

Related U.S. Application Data

[63] Continuation of Ser. No. 418,331, Oct. 6, 1989, abandoned.

[30] Foreign Application Priority Data

Oct. 21, 1988 [JP] Japan .................... 63-266948

[51] Int. Cl.$^5$ .................................. C08K 3/00
[52] U.S. Cl. ............................. 523/513; 523/171; 523/527
[58] Field of Search ............. 523/513, 171, 527

[56] References Cited

U.S. PATENT DOCUMENTS

| | | | |
|---|---|---|---|
| 4,374,215 | 2/1983 | Atkins ................... | 523/526 |
| 4,507,432 | 3/1985 | Banno et al. ........... | 525/17 |
| 4,829,103 | 5/1989 | Oda et al. .............. | 525/513 |
| 4,895,895 | 1/1990 | Osborne et al. ....... | 523/526 |

OTHER PUBLICATIONS

Titow; Reinforced Thermoplastics; John Wiley & Sons; 1975; pp. 82–83.

*Primary Examiner*—Paul R. Michl
*Assistant Examiner*—Edward Cain
*Attorney, Agent, or Firm*—Wenderoth, Lind & Ponack

[57] ABSTRACT

An unsaturated polyester molding compound of which viscosity at 25° C. is about $10^7$ centipoise or more, containing (1) glass fiber of about 0.05 to 3 mm in length, (2) 4-methyl-2,4-diphenylpentene-1, and (3) a transparent filler can give glossy, transparent, thick, profile articles without cracking even at high temperatures. Therefore, the molding compound is used advantageously for production, for example, of bathtubs, kitchen counters, and lavatory and dressing tables.

4 Claims, 1 Drawing Sheet

UNSATURATED POLYESTER MOLDING COMPOUNDS AND THE ARTICLES THEREOF

This application is a continuation of now abandoned application Ser. No. 07/418,331 filed on Oct. 6, 1989 now abandoned.

This invention relates to molding compounds for production of transparent artificial marble molded articles and the articles thereof.

The compounds of this invention are used for to molding thick products, such as a bathtub, lavatory, dressing table and counter, which are free from cracking during compression molding and are excellent in transparency.

BACKGROUND OF THE INVENTION

In general, transparent artificial marble articles are produced by compression molding of a sheet molding compound (abbreviated as SMC hereinafter), or a thick molding compound (abbreviated as TMC hereinafter), or a bulk molding compound (abbreviated as BMC hereinafter) containing glass or mineral powder, such as aluminum hydroxide powder, as the filler, and glass fiber. However, transparency is reduced when molding compound contains glass fiber of 1 inch in length because the fiber pattern remains inevitably on the surfaced article. Therefore BMC or TMC containing short fiber of ¼ inch in length or glass chop of 3 mm in length is generally used for molding at 100° C. to 160° C. with metal toolings. In the case of a flat panel, it is possible to mold articles of 6 mm or more in thickness or of uneven thickness, but when molding a profile article, cracking will occur at the corner of the articles; therefore molding is carried out at a lower temperature by taking a longer time, or molding is carried out by using fiber reinforcement in addition to a molding material to prevent cracking.

A method has been proposed to prevent cracking and improve transparency by adding crosslinked styrene polymer and glass powder (Japanese Patent Application Laid-Open No. 64858/87). With this method, transparency is improved, though the method has a disadvantage that transparency is reduced when the amount of the additives is enough to prevent cracking.

Recently mass production of transparent, molded articles, such as bathtubs, lavatories dressing tables and kitchen counters, has been attempted by compression molding.

It is worth developing a technology to mold profile articles such as bathtubs or kitchen counters of uneven thickness: The general trend in these products is that glass fiber content is suppressed as far as possible to give transparency, while the thickness is increased to ensure the strength as well as massive and deep appearance. During molding of such thick articles, cracking tends to occur at the corner of the products. Cracking is prevented by lowering the molding temperature, but it causes poor surface gloss and long molding cycles.

DETAILED DESCRIPTION OF THE INVENTION

Figure 1:
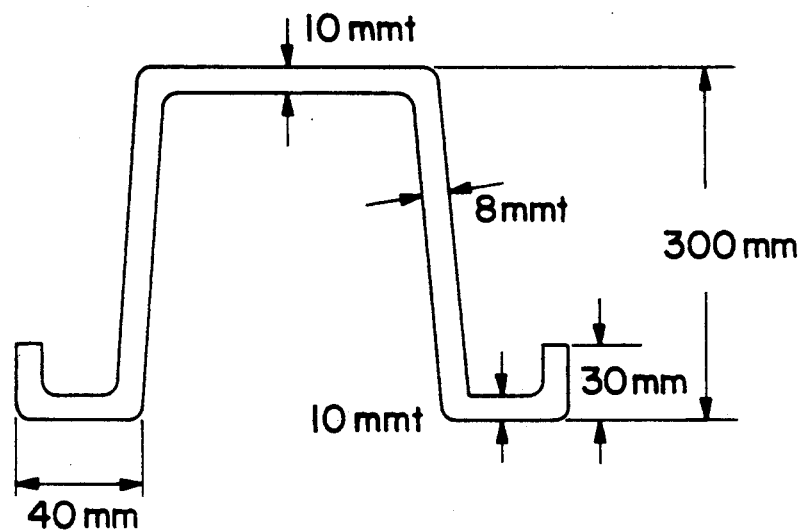

As the result of investigations to solve the problems described above, the inventors found that unsaturated polyester molding compounds of which viscosity at 25° C. is $10^7$ cps or more, containing (1) glass fiber of about 0.05 to 3 mm in length, (2) 4-methyl-2,4-diphenylpentene-1, and (3) a transparent filler are suitable for mass production of thick, profile molded articles having no cracking even at high temperatures, and by this discovery, the present inventors have completed this invention.

This invention relates to unsaturated polyester molding compounds of which viscosity at 25° C. is $10^7$ cps or more, and containing (1) glass fiber of about 0.05 to 3 mm in length, (2) 4-methyl-2,4-diphenylpentene-1, and (3) a transparent filler, and to the molded articles by compression molding of the said compounds.

The unsaturated polyester molding compounds used in this invention are in the form of SMC, TMC or BMC, and contain (1) glass fiber of about 0.05 to 3 mm in length, (2) 4-methyl-2,4-diphenylpentene-1, and (3) a transparent filler. Among the unsaturated polyester molding compounds, those of which viscosity at 25° C. is about $10^7$ centipoise or more, preferably about $5 \times 10^7$ centipoise or more, are used for this invention.

Unsaturated polyesters are synthesized by condensation between $\alpha, \beta$-olefinic unsaturated dicarboxylic acid and dihydric glycol; in addition to these two components, saturated dicarboxylic acid, aromatic dicarboxylic acid or dicyclopentadiene reactive with carboxylic acid may be used together. Examples of $\alpha, \beta$-unsaturated dicarboxylic acid include maleic acid, fumaric acid, itaconic acid, citraconic acid and anhydrides of these dicarboxylic acids. Examples of dicarboxylic acid which are used together with these $\alpha, \beta$-olefinic unsaturated dicarboxylic acids include adipic acid, sebacic acid, succinic acid, gluconic acid, phthalic anhydride, o-phthalic acid, isophthalic acid, terephthalic acid, tetrahydrophthalic acid, and tetrachlorophthalic acid. Examples of dihydric glycol include alkanediols, oxaalkanediols, and diols obtained by addition of ethylene oxide or propylene oxide to bisphenol A. In addition, monools or trihydric triols may be used. Examples of alkanediol include ethylene glycol, 1,2-propylene glycol, 1,3-propylene glycol, 1,3-butanediol, 1,4-butanediol, neopentyl glycol, 1,5-pentanediol, 1,6-hexanediol, and cyclohexanediol. Examples of oxaalkanodiol include dioxyethylene glycol and trioxyethylene glycol. Examples of mono- or tri-hydric alcohol to be used together with the glycols include octyl alcohol, oleyl alcohol, and trimethylol propane.

Examples of olefinic unsaturated monomers used as a diluent for the unsaturated polyesters described above include styrene, p-chlorostyrene, vinyltoluene, divinylbenzene, and esters of acrylic acid or methacrylic acid with alcohols having 1 to 18 carbon atoms each (e.g. methyl methacrylate, butyl acrylate, hydroxypropyl acrylate, hydroxypropyl methacrylate, trimethylolpropane trimethacrylate). The amount of the olefinic unsaturated monomer is about 10 to 400 weight parts per 100 weight parts of the unsaturated polyester.

Unsaturated polyester molding compounds may be used after thickening by addition of thickeners such as oxides or hydroxides of alkali earth metals such as magnesium or calcium. When the thickeners are used, the amount is about 0.2 to 5 weight parts per 100 weight parts of the resinous component in the unsaturated polyester molding compounds.

In this invention glass fiber of about 0.05 to 3 mm in length is added. The diameter of glass fiber is 9 to 15 $\mu$, and about 1 to 100 weight parts, preferably about 3 to 40 weight parts, of glass fiber is used per 100 weight parts of the resinous component in the unsaturated polyester molding compounds. Addition of glass fiber reduces mold shrinkage.

The amount of 4-methyl-2,4-diphenylpentene-1 added in this invention is about 0.01 to 1 weight parts, preferably about 0.05 to 1 weight parts per 100 weight parts of the resinous component of the compounds.

The transparent fillers used in this invention include glass powder of about 20 to 350 mesh, preferably about 100 to 200 mesh, and aluminum hydroxide of about 0.2 to 50 $\mu$, preferably about 2 to 5 $\mu$ in average particle size. The amount of glass powder is about 10 to 400 weight parts, preferably about 150 to 350 weight parts, per 100 weight parts of the resinous component of the unsaturated polyester molding compound.

The amount of aluminum hydroxide is about 10 to 300 weight parts, preferably about 30 to 150 weight parts, per 100 weight parts of the resinous component of the unsaturated polyester molding compound. Glass powder and aluminum hydroxide may be combined.

Mixing of (1) glass fiber, (2) 4-methyl-2,4-diphenylpentene-1, and (3) a transparent filler into the unsaturated polyester resin is performed, for example, by adding during preparation of the unsaturated polyester molding compound by kneader, cowles high shear mixer or planetary mixer.

The amount of the resinous component in the unsaturated polyester molding compound is about 15% by weight to about 90% by weight.

The unsaturated polyester molding compound described above may contain if necessary, cross-linked polystyrene, fillers other than those described above, internal mold release agents, catalysts, reinforcements, curing modifiers, pigments, etc.

Cross-linked polystyrene has crosslinking density of about 0.2 to 30%, preferably of about 0.5 to 10%, prepared by copolymerizing styrene with a crosslinkable monomer such as divinylbenzene derivatives, alkylene glycol diacrylate derivatives, alkylene glycol dimethacrylate derivatives, or diallylphthalate, in which styrene monomer is crosslinked with a crosslinkable monomer to form three-dimensional network structure. Cross-linked polystyrene is usually added as powder of which particle size is about 100 $\mu$ or less, preferably about 20 to 50 $\mu$. The amount of the cross-linked polystyrene is about 1 to 20 weight parts, preferably about 3 to 15 weight parts, per 100 parts of the resinous component of the unsaturated polyester molding compound.

Fillers other than those described before include calcium carbonate, talc, silica, clay, glass powder and glass balloon.

Internal mold release agents include zinc stearate and calcium stearate. Catalysts include benzoyl peroxide, t-butylperoctoate, t-butyl peroxy benzoate and t-butyl-peroxy-isopropyl carbonate. Reinforcing fibers include vinylon, nylon, polyaramide, carbon and asbestos. Curing modifiers include parabenzoquinone, and t-butylhydroxytoluene. Pigments include titanium oxide, carbon black, iron, and phthalocyanine blue.

The unsaturated polyester molding compounds thus prepared are subjected to compression molding.

The molding is usually carried out with a press machine at a temperature of about 105° to 150° C. under the pressure of about 50 to 100 kgf/cm$^2$. This process produces transparent artificial marble-like articles.

It is possible to mold glossy, transparent, thick, profile articles from the compounds of this invention, without cracking even at high temperatures. Therefore the compounds of this invention are used advantageously for production, for examples, of bathtubs, kitchen counters, and lavatory and dressing tables etc.

PREFERRED EMBODIMENTS OF THE INVENTION

The following Examples and Comparative Examples will illustrate the invention in more detail. Examples 1 to 6 and Comparative Examples 1 to 5

Figure 2:
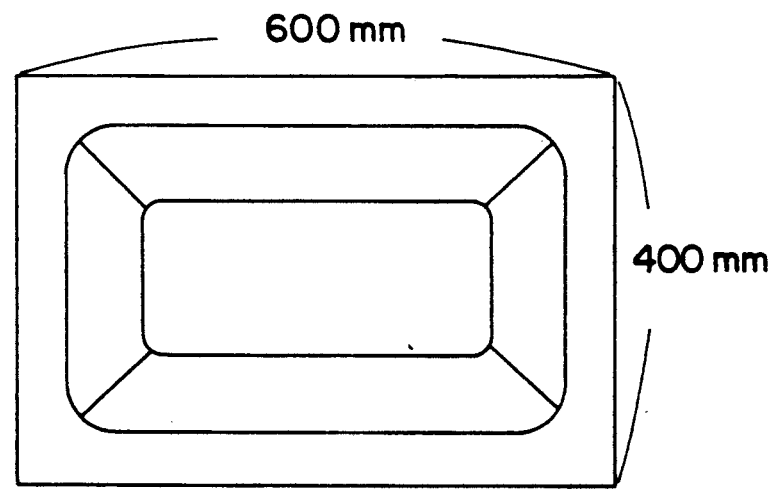

Unsaturated polyester molding compounds were prepared from the ingredients listed in Table 1, and so-called mini-baths were compression molded with a press machine. (shown in FIGS. 1 and 2) Transparency, gloss, and crackings during molding were investigated, and the result is shown in the bottom of Table 1.

Comparative Examples are listed in Table 2.

TABLE 1

| Working Example | | 1 | 2 | 3 | 4 | 5 | 6 |
|---|---|---|---|---|---|---|---|
| Unsaturated polyester A[1] | | 98 | — | 100 | 70 | 98 | 97 |
| Unsaturated polyester B[2] | | — | 98 | — | 30 | — | — |
| Cross-linked polystyrene[3] | | 2 | 2 | — | 3 | 2 | 3 |
| 4-Methyl-2,4-diphenylpentene-1[4] | | 0.2 | 0.2 | 0.2 | 0.2 | 0.5 | 0.2 |
| t-Butyl peroxyisopropyl carbonate | | — | — | 1.0 | 1.0 | — | — |
| t-Butyl peroctoate | | 0.3 | 0.3 | — | — | 0.3 | 0.3 |
| t-Butyl peroxy benzoate | | 0.7 | 0.7 | — | — | 0.7 | 0.7 |
| t-Butylhydroquinone | | 0.02 | 0.02 | 0.04 | 0.03 | 0.02 | 0.02 |
| Zinc stearate | | 3 | 3 | 3 | 3 | 3 | 3 |
| Glass powder[5] | | 300 | 300 | 300 | 200 | 300 | 300 |
| Aluminum hydroxide[6] | | — | — | — | 100 | — | — |
| Magnesium oxide | | 1.5 | 1.5 | 1.5 | 1.5 | 1.5 | 1.0 |
| Glass fiber  1.5 mm long | | — | — | — | — | — | 10 |
|   0.5 mm long 7 | | 20 | 20 | 20 | 20 | 20 | — |
| Viscosity of compound (25° C.) cps | | 2 × 10$^7$ | 3 × 10$^7$ | 3 × 10$^7$ | 4 × 10$^7$ | 2 × 10$^7$ | 2 × 10$^7$ |
| Molding temp and time at 125/115° C. for 10 min. | light transmission | 28 | 24 | 30 | 20 | 28 | 22 |
| | gloss 60° | 78 | 82 | 87 | 76 | 66 | 85 |
| | cracking | ⊚ | ○ | ○ | ○ | ⊚ | ⊚ |
| at 135/125° C. for 10 min. | light transmission | 26 | 22 | 29 | 18 | 25 | 20 |
| | gloss 60° | 83 | 83 | 87 | 82 | 77 | 89 |
| | cracking | ○ | ○ | ○ | ○ | ⊚ | ⊚ |

(Note) cracking
○-⊚ none   X hair crack   XX severe crack

TABLE 2

| Comparative Example | 1 | 2 | 3 | 4 | 5 |
|---|---|---|---|---|---|
| Unsaturated polyester A[1] | 98 | — | 100 | 70 | 98 |
| Unsaturated polyester B[2] | — | 98 | — | 30 | — |
| Cross-linked polystyrene[3] | 2 | 2 | — | 3 | 2 |
| 4-Methyl-2,4-diphenylpentene-1[4] | — | — | — | — | — |
| t-Butyl peroxyisopropyl carbonate | — | — | 1.0 | 1.0 | — |
| t-Butyl peroctoate | 0.3 | 0.3 | — | — | 0.3 |
| t-Butyl perbenzoate | 0.7 | 0.7 | — | — | 0.7 |
| t-Butylhydroquinone | 0.02 | 0.02 | 0.04 | 0.03 | 0.02 |
| Zinc stearate | 3 | 3 | 3 | 3 | 3 |
| Glass powder[5] | 300 | 300 | 300 | 200 | — |
| Aluminum hydroxide[6] | — | — | — | 100 | 250 |
| Magnesium oxide | 1.5 | 1.5 | 1.5 | 1.5 | 1.5 |
| Glass fiber 0.5 mm long 7 | 20 | 20 | 20 | 20 | 20 |
| Viscosity of compound (25° C.) cps | $2 \times 10^7$ | $3 \times 10^7$ | $3 \times 10^7$ | $4 \times 10^7$ | $6 \times 10^7$ |
| Molding temp and time at 125/115° C. for 10 min. — light transmission | 28 | 24 | 30 | 23 | 17 |
| gloss 60° | 76 | 80 | 86 | 74 | 82 |
| cracking | X | X | XX | X | X |
| at 135/125° C. for 10 min. — light transmission | 27 | 24 | 27 | 21 | 15 |
| gloss 60° | 80 | 81 | 85 | 75 | 72 |
| cracking | XX | XX | XX | XX | XX |

(Note) cracking during molding
X hair crack  XX severe crack

NOTE

1. Based on bisphenol A
2. Based on neopentyl glycol
3. Product composed of 99 parts of styrene and 0.55 parts of divinylbenzene, average particle size 30 μ
4. Nofmer MSD manufactured by NIPPON OIL AND FATS CO., LTD.
5. Glass powder M10S manufactured by Nihon Ferrow, particle size 80 to 200 mesh;
6. CW-308, CW-326, manufactured by Sumitomo Chemical Co., Ltd.
7. FESS 005, manufactured by Fuji Fiber

What is claimed is:

1. An unsaturated polyester molding compound for production of a transparent artificial marble molded article, having a viscosity at 25° C. of about $10^7$ centipoise or more, containing (1) glass fiber of about 0.05 to 3 mm in length, (2) 4-methyl-2,4-diphenylpentene-1, and (3) a transparent filler which is glass powder of about 20 to 350 mesh in average particle size and optionally aluminum hydroxide of about 0.2 to 50 μ in average particle size, wherein the amount of 4-methyl-2,4-diphenylpentene-1 is about 0.05 to 1 weight part per 100 parts of the unsaturated polyester resinous component, the amount of the glass fiber is about 1 to 100 weight parts per 100 parts of the unsaturated polyester resinous component and the amount of the transparent filler is about 10 to 400 weight parts per 100 weight parts of the unsaturated polyester resinous component.

2. The unsaturated polyester molding compound claimed in claim 1, the viscosity of which at 25° C. is about $5 \times 10^7$ centipoise or more.

3. The unsaturated polyester molding compound claimed in claim 1, which further contains cross-linked polystyrene.

4. A transparent marble article produced by the compression molding of the unsaturated polyester molding compound of claim 1.

* * * * *